(12) United States Patent
Dorbessan (10) Patent No.: US 12,299,912 B2
(45) Date of Patent: May 13, 2025

(54) METHOD AND DEVICE FOR PASSIVE RANGING BY IMAGE PROCESSING

(71) Applicant: MBDA France, Le Plessis-Robinson (FR)

(72) Inventor: Paul Dorbessan, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 595 days.

(21) Appl. No.: 17/619,629

(22) PCT Filed: May 26, 2020

(86) PCT No.: PCT/FR2020/050876
§ 371 (c)(1),
(2) Date: Dec. 16, 2021

(87) PCT Pub. No.: WO2020/260783
PCT Pub. Date: Dec. 30, 2020

(65) Prior Publication Data
US 2022/0358664 A1  Nov. 10, 2022

(51) Int. Cl.
*G06K 9/00* (2022.01)
*G06T 7/50* (2017.01)
(Continued)

(52) U.S. Cl.
CPC .................. *G06T 7/50* (2017.01); *G06T 7/70* (2017.01); *G06V 10/764* (2022.01); *G06V 10/82* (2022.01);
(Continued)

(58) Field of Classification Search
CPC ... G06T 7/50; G06T 7/70; G06T 2207/20081; G06T 2207/20084; G06T 2207/30212;
(Continued)

(56) References Cited

U.S. PATENT DOCUMENTS

2019/0005681 A1    1/2019  Blott et al.

FOREIGN PATENT DOCUMENTS

CN             109215073 A        1/2019

OTHER PUBLICATIONS

Li, Xin, et al. "Perspective correction using camera intrinsic parameters." 2016 IEEE 13th International Conference on Signal Processing (ICSP). IEEE, 2016. (Year: 2016).*

(Continued)

*Primary Examiner* — Jonathan S Lee
(74) *Attorney, Agent, or Firm* — Morgan, Lewis & Bockius LLP (57) ABSTRACT

The device (1) for estimating the distance between an observer (2) and a target (4) using at least one image generated by a digital image generator (6) from the position (P1) of the observer (2) comprises a detection and identification unit configured to detect and identify a target (4) in the image at least from a predetermined list of known targets, an orientation estimation unit configured to determine the orientation of the identified target in the image, and a distance estimation unit configured to measure, in the image, the length of at least one characteristic segment of the target and to calculate the distance from said measured length, an actual length of the segment on the target taking into account the orientation of the target, and the spatial resolution of the digital image generator (6).

17 Claims, 3 Drawing Sheets

(51) Int. Cl.
*G06T 7/70* (2017.01)
*G06V 10/764* (2022.01)
*G06V 10/82* (2022.01)

(52) U.S. Cl.
CPC ............... *G06T 2207/20081* (2013.01); *G06T 2207/20084* (2013.01); *G06T 2207/30212* (2013.01); *G06V 2201/07* (2022.01)

(58) Field of Classification Search
CPC ... G06V 10/82; G06V 10/764; G06V 2201/07
USPC ........................................................ 382/103
See application file for complete search history.

(56) References Cited

OTHER PUBLICATIONS

Swapna, OpenCV: How-to calculate distance between camera and object using image?, 2012, https://stackoverflow.com/questions/14038002/opencv-how-to-calculate-distance-between-camera-and-object-using-image (Year: 2012).*
Rosebrock, "Find distance from camera to object/marker using Python and OpenCV," Pyimagese Arch, Image Processing <<https://pyimagesearch.com/category/image-processing/>> (Jul. 8, 2021).
International Search Report issued in corresponding International Patent Application No. PCT/FR2020/050876 dated Sep. 18, 2020.
Mousavian et al., "3D Bounding Box Estimation Using Deep Learning and Geometry," arxiv.org, Cornell University Library, 201 OLIN Library Cornell University (2016).
Chabot et al., "Deep MANTA: A Coarse-to-fine Many-Task Network for joint 2D and 3D vehicle analysis from monocular image," arxiv.org, Cornell University Library, 201 OLIN Library Cornell University (2017).

* cited by examiner

METHOD AND DEVICE FOR PASSIVE RANGING BY IMAGE PROCESSING

TECHNICAL FIELD

The present invention relates to a method and device for estimating the distance (or ranging) between an observer and a target, using at least one image generated by a digital image generator.

Although not exclusively, the present invention is particularly applicable to the military field. In the military field, the estimation of the distance of a target or a threat (relative to the observer) is very important. It is of particular interest:

for the tactical intelligence (relative position of a target with respect to the observer);
for the progression (maintaining a safe distance); and
for the engagement of a munition (shell or missile fire).

PRIOR ART

In the scope of the present invention, a target is any object, for example a building or a vehicle, or any other element, whose distance is to be measured.

Different systems, based on different and various technologies, are known to measure the distance between an observer and a target, i.e. between the position of the observer and that of the target.

In particular, methods based on the analysis of a light signal emitted by the observer and reflected by the observed target are known. Such a method exists in active systems such as a laser rangefinder, a 3D scanner, a lidar or time-of-flight cameras. The distance measurement is performed by different analyses, implemented in these systems, such as the delay measurement of the echo of the emitted signal, the measurement of the phase shift between the emitted and reflected signals, the measurement of a frequency modulation, and the measurement of the decrease of the intensity of the reflected signal.

All the active methods have disadvantages in terms of stealth. Indeed, they require the emission of an electromagnetic radiation towards the observed target. This radiation is detectable, which is not desirable in some applications. In addition, it requires specific active equipment, which may be expensive.

There are also passive methods, in particular focusing methods of a imager with a shallow field depth. Such a method requires a specific equipment that is poorly adapted to other uses that could be envisaged with the same optical device, such as the observation or the surveillance of an area.

Other passive methods based on triangulation also have disadvantages. A typical device uses generally two imagers, which is problematic in terms of cost and space requirements. In addition, the performance is directly related to the distance between the two imagers, which is particularly unfavorable for the space requirements. A variant with a single moving imager requires the observer to move, which is not always possible.

These usual solutions are therefore not completely satisfactory.

The object of the present invention is to provide a particularly advantageous passive distance measurement (or ranging).

SUMMARY OF THE INVENTION

The present invention relates to a method for estimating a distance between a position of an observer and a target, using at least one image generated by a digital image generator (or digital imager or digital camera) from the position of the observer, which allows to remedy the aforementioned disadvantages.

To this end, according to the invention, said distance estimation method comprises a sequence of steps comprising:

a detection and identification step consisting in detecting and identifying at least one target in the image, from at least one (predetermined) list of known targets;
an orientation estimation step consisting in determining, in the image, the orientation of the target identified (in said image); and
a distance estimation step, the distance estimation step comprising a measurement sub-step consisting of measuring, on the image, the length of at least one characteristic segment of the target, and a calculation sub-step consisting in calculating said distance (between the observer and the target) from said measured length (on the image), an actual length known of the characteristic segment on the target taking into account the orientation of the target, i.e. an actual length as viewed, and the spatial resolution of the digital image generator.

Thus, thanks to the invention, a method is obtained which allows to estimate, automatically and without contact, the distance separating an object (target) and an observer, without the latter having to move, and this by means of an optical system (image generator) which is passive, i.e. which does not emit electromagnetic waves in the direction of the target to interact with it.

In a preferred embodiment, the detection and identification step comprises:

a detection sub-step consisting in detecting a target in the image; and
a recognition and identification sub-step consisting in assigning a class to the detected target. Preferably, said class is one of the following classes: a recognition class, an identification class. The attribution of a class corresponds to the determination of a category; if this category is generic (for example, a truck or a tank) we speak of recognition and when it allows the identification of a precise model of the object (for example a particular model of tank) we speak of identification.

Advantageously, the detection sub-step consists in performing one of the following operations on the image: identifying the pixels of the target, identifying the pixels of the outline of the target, generating a bounding box encompassing the target.

In addition, advantageously, the detection and identification step implements a machine learning using classification models. A learning technique for the detection can be used advantageously (but not necessarily and independently of the identification models). Advantageously, the method comprises at least one first learning step, implemented prior to the detection and identification step, consisting in generating said classification models.

Furthermore, in a first embodiment, the orientation estimation step consists in comparing the target to predetermined target models (of known targets), while in a second embodiment, the orientation estimation step consists in implementing an estimation method based on a non-linear regression. In this second embodiment, the method comprises at least one second learning step, implemented prior to the orientation estimation step, consisting in generating at least one non-linear regression model.

To estimate the orientation of the target, models built prior to the mission are used based on knowledges of the known targets taken into account by the device. The use of nonlinear regressions learned by learning (second embodiment) is one way to use models. Another way is the use of 3D geometric models (first embodiment). In the second embodiment the models are learned by learning, and in the first embodiment the models are built by a manual procedure (which may comprise automatic but not learning-based operations).

Further, in a particular embodiment, at least one of said first and second learning steps implements one of the following algorithms:
- at least one support vector machine algorithm;
- at least one algorithm based on a decision tree forest;
- at least one convolutional neural network.

A machine learning technique can be used independently for the detection, the recognition, the identification and the orientation estimation.

In the scope of the present invention, the machine learnings of classification models (in detection, recognition and identification) or regression models (on the orientation of the objects) is performed on known object bases.

Furthermore, in a preferred embodiment, the calculation sub-step consists in calculating the distance D between the position of the observer and the target using the following expression:

$$D=dm/(dp\cdot\theta)$$

in which:
- dm represents an apparent length of the characteristic segment, corresponding to the actual length of the characteristic segment (preferably measured in meters in the scene) taking into account the orientation of the target;
- dp represents the measured length (preferably in number of pixels) of the image of the characteristic segment; and
- θ represents the spatial resolution of the digital image generator.

In a particular embodiment, the method further comprises at least one of the following steps:
- an image generation step, implemented prior to the detection and identification step, consisting in generating at least one image using the image generator from the position of the observer;
- an information transmission step, implemented after the distance estimation step, consisting in transmitting at least the estimated distance to at least one user system.

Furthermore, in a first embodiment, the detection and identification step and the orientation estimation step are two separate steps, implemented successively, whereas, in a second embodiment, the detection and identification step and the orientation estimation step are implemented in a single step (referred to as detection, identification and orientation). When considering simultaneous the detection, the identification and the orientation, the possible embodiment foresees using models built by machine learning consisting in detecting and identifying both the target model and the orientation simultaneously (for example, using a model allowing to extract from the image the tanks of a given model from the front, the trucks of a given model from the profile, etc.).

The method can be implemented in two different ways. Specifically:
- in a first embodiment, it is implemented (fully) automatically; and
- in a second embodiment, the detection and identification step and the orientation estimation step are implemented semi-automatically (with an intervention of an operator), and the distance estimation step is implemented automatically.

In this second embodiment, it is envisaged that the operator can independently intervene on the segmentation of the object, on the identification class of the object and on the orientation, using a man/machine interface (for example a software with a graphic interface implemented on a touch-screen or with a cursor). For example, the operator helps the device to draw the outlines of the object, or he informs the type of object he has extracted from the image (e.g. a tank of a given type), or he informs the device that the observed tank is in front or in profile.

The present invention also relates to a device for estimating the distance between a position of an observer and a target, using at least one image generated by a digital image generator from the position of the observer.

According to the invention, said (distance estimation) device comprises:
- a detection and identification unit configured to detect and identify at least one target in the image, from at least one list of known targets;
- an orientation estimation unit configured to determine the orientation of the identified target in the image; and
- a distance estimation unit configured to measure, in the image, the length of at least one characteristic segment of the target, and to calculate the distance from said measured length, an actual length of the characteristic segment on the target taking into account the orientation of the target and the spatial resolution of the digital image generator.

Further, in a particular embodiment, said device also comprises at least one of the following elements:
- at least one predetermined database containing at least said list of known targets;
- the digital image generator configured to generate at least one image from the position of the observer;
- an information transmission unit configured to transmit at least the estimated distance to at least one user system.

BRIEF DESCRIPTION OF FIGURES

The figures of the attached drawing will make it clear how the invention can be carried out. In these figures, identical references designate similar elements.

DETAILED DESCRIPTION

The distance estimation device 1 (hereinafter "device") shown schematically in FIG. 1 and allowing to illustrate the invention is intended at least to estimate the distance between a position of an observer and a position of a target.

The observer is preferably a human being, but it can also be a technical system that comprises in particular a digital image generator.

Figure 2:
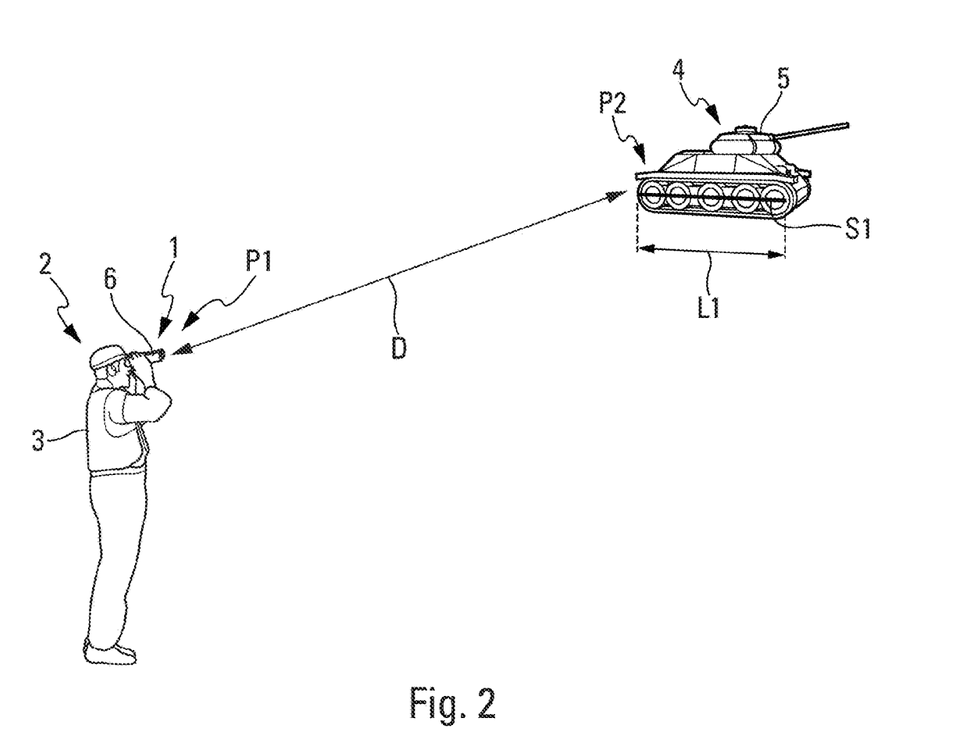
FIG. 2 shows a particular application of a distance measurement of a target.

Target 4 means any object, e.g. a building, a mobile or non-mobile vehicle or any other element, the distance of which is to be measured (relative to the observer 2). In the example shown in FIG. 2, illustrating a particular application, the observer 2 is a soldier 3 and the target 4 is a tank 5. Although particularly suitable for the military field, the device 1 can also be used in the civilian field.

The device 1 is intended to estimate the distance with the aid of at least one digital image I (FIGS. 3 and 4) generated by a digital image generator 6 (or imager or camera) from the position of the observer, in particular by implementing a processing of this image I. The image generator 6 which took the image may be operated by the observer or by another person or by an appropriate system.

More precisely, the device 1 is intended to estimate the distance D between the current position P1 of the observer 2 (from which the image I was taken) and the current position P2 of the target 4, as shown in FIG. 2. The current positions P1 and P2 are the geographical positions of the observer 2 and the target 4 at the time the image (used for the estimation) is taken by the image generator 6.

In the scope of the present invention, the observer 2 and/or the target 4 do not need to be mobile to implement the distance estimation. However, the observer 2 may be movable or stationary, and the target 4 may be movable or stationary, for the implementation of the present invention.

Figure 1:
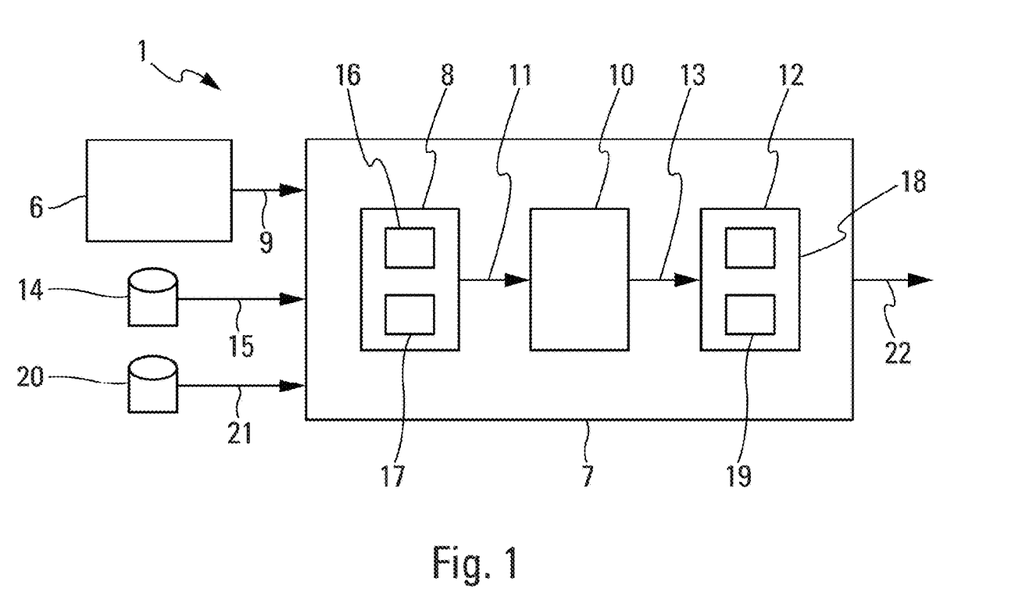
FIG. 1 is a block diagram of a distance estimation device which illustrates a particular embodiment of the invention.

The device 1 comprises, as shown in FIG. 1, a central unit 7 which comprises:
- a detection and identification unit 8 configured to detect and identify at least one target 4 in the image I (received from the image generator 6 via a link 9), from at least one (predetermined) list of known targets (or objects);
- an orientation estimation unit 10 connected by means of a link 11 to the detection and identification unit 8 and configured to determine the orientation of the target 4 identified in the image I; and
- a distance estimation unit 12 connected by means of a link 13 to the orientation estimation unit 10.

The device 1 further comprises at least one predetermined database 14, containing at least said predetermined list of known targets. In a particular embodiment, the device 1 comprises a set (not shown) of a plurality of databases 14, only one of which is shown in FIG. 1, comprising, for example, different target types respectively.

The known targets may be different versions or different models of a same type of sought vehicle or object, for example a mobile vehicle, in particular a land-based, such as a tank, a military truck or the like. It can also be different types of targets (tank, transport vehicle, etc.).

In a first embodiment shown in FIG. 1, the database 14 or the set of databases 14 may be arranged outside the central unit 7 and connected to the latter by means of a link 15. Furthermore, in a second embodiment (not shown), the database or set of databases is integrated into the central unit 7.

The device 1 further comprises at least one predetermined database 20, containing further predetermined information specified below. In a particular embodiment, the device 1 comprises a set (not shown) of a plurality of databases 20, only one of which is shown in FIG. 1.

In a first embodiment shown in FIG. 1, the database 20 or the set of databases 20 may be arranged outside the central unit 7 and connected to the latter by means of a link 21.

Furthermore, in a second embodiment (not shown), the database or the set of databases is integrated into the central unit 7.

In one embodiment, the device 1 comprises a single database (not shown), and the data from the databases 14 and 20 are integrated into this single database.

In a preferred embodiment, the detection and identification unit 8 comprises:
- a detection unit 16 configured to detect a target 4 in the image I; and
- a recognition and identification unit 17 configured to assign a class to the detected target.

The detection and identification unit 8 thus comprises a processing chain of the DRI type (for "Detection, Recognition and Identification") which has the function of detecting and locating, as well as identifying the objects (or targets) of the database 14 which are possibly present in the image I.

In addition, the distance estimation unit 12 comprises:
- a measurement element 18 configured to measure on the image I the length of a characteristic segment S1, S2, S3 (FIGS. 3 and 4) of the target 4, as specified below; and
- a calculation element 19 configured to calculate the distance D, from both said length measured by the measurement element 18, an actual length of the segment S1, S2, S3 on the target 4 taking into account the orientation of the target 4 and the spatial resolution of the image generator 6.

Furthermore, in a particular embodiment, said device 1 also comprises the image generator 6 which is thus configured to generate at least one image I from the position P1 of the observer 2.

In a preferred embodiment, the image generator 6 is an optoelectronic imager, for example an RGB (for "Red, Green, Blue") camera or an infrared camera.

Furthermore, in a particular embodiment, said device 1 comprises an information transmission unit (not shown) which is configured to transmit at least the estimated distance D (as well as the identity of the target for example) to at least one user system (not shown) via a link 22 (FIG. 1).

The device 1, as described above, implements a distance estimation method P (hereinafter "method") shown in FIG. 5.

Figure 5:
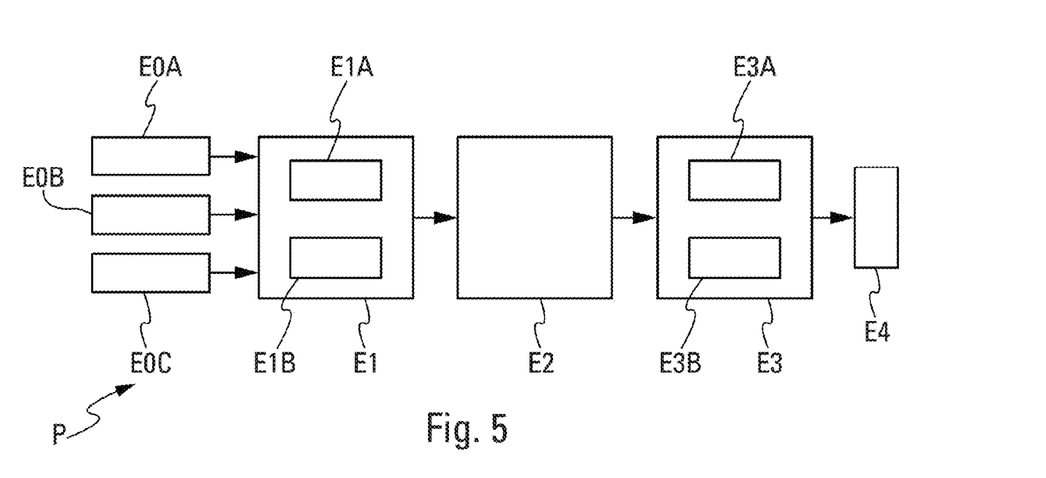
FIG. 5 is a block diagram of a target distance estimation method.

Said method P comprises, as shown in FIG. 5, a sequence of steps E1 to E3 comprising:
- a detection and identification step E1, implemented by the detection and identification unit 8, consisting in detecting and identifying at least one target 4 in the image I generated by the image generator 6. The identification consists in finding in the image I at least one target 4 corresponding to one of the targets included in the list of known targets contained in the database 14;
- an orientation estimation step E2, implemented by the orientation estimation unit 10, consisting in determining (or estimating) the orientation, in the image I, of the target 4 identified in the detection and identification step E1 and
- a distance estimation step E3, implemented by the distance estimation unit 12.

Said method P also comprises, as shown in FIG. 5, an information transmission step E4, implemented after the distance estimation step E3, consisting in transmitting at least the estimated distance D to at least one user system.

In a preferred embodiment, the detection and identification step E1 comprises:
- a detection sub-step E1A, implemented by the detection unit 16, consisting in detecting a target 4 in the image I; and
- a recognition and identification sub-step E1B, implemented by the recognition and identification unit 17, consisting in assigning to the target 4 detected in the image I, a recognition class or an identification class, specified below.

The detection sub-step E1A consists in performing one of the following operations on the image: identifying the pixels of the outline of the target or the pixels of the target or generating a bounding box encompassing the target.

Figure 3:
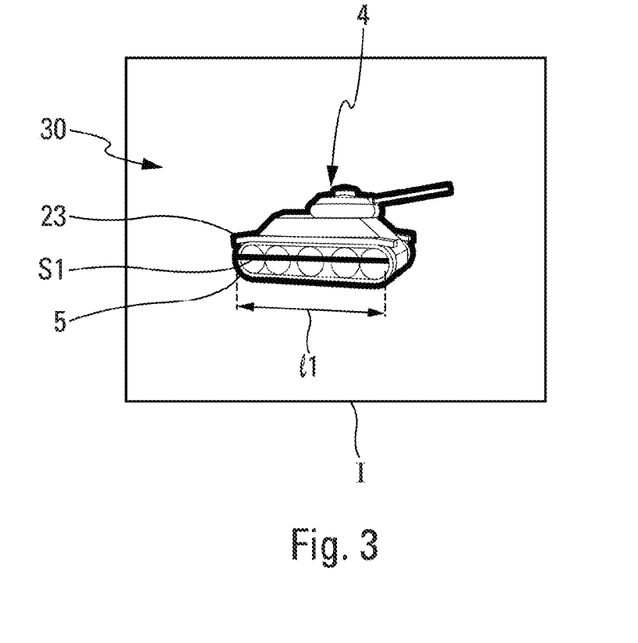
FIG. 3 illustrates a first example of identification of a target in an image.
Figure 4:
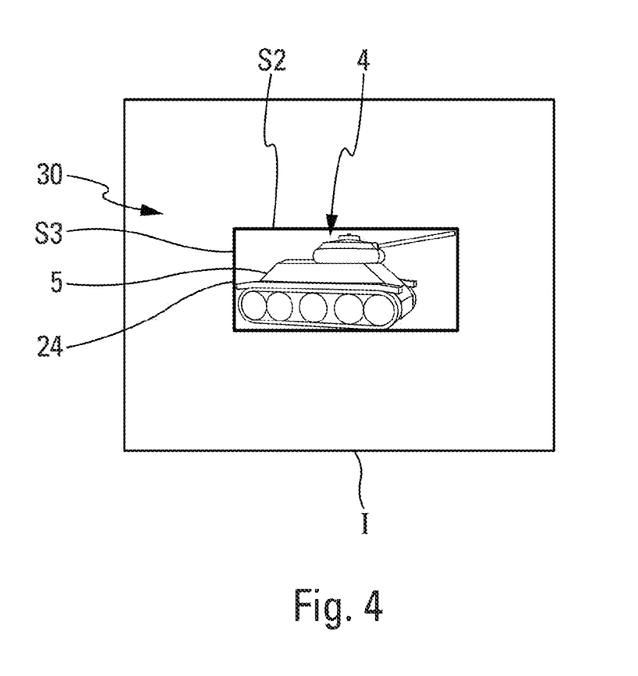
FIG. 4 shows a second example of identification of a target in an image.

The detection sub-step E1A aims to segment the target 4 finely, i.e. to distinguish it from the background 30 of the image I (FIGS. 3 and 4).

To this end, in a first embodiment shown in FIG. 3, the detection sub-step E1A identifies the pixels belonging to the outline 23 of the target 4, as highlighted by a thick line in FIG. 3.

Furthermore, in a second embodiment shown in FIG. 4, the detection sub-step E1A generates a bounding box 24, preferably rectangular in shape, which encloses the target 4. The bounding box 24 is the smallest surface box adapted to completely encompass the target 4.

The purpose of the detection and identification step E1 is thus to detect and locate, as well as to identify the targets of the database 14, possibly present in the image I.

This detection and identification step E1 thus comprises two main functions (or sub-steps), namely:
- the detection sub-step E1A, the purpose of which is to segment the target 4 finely in the image I, i.e. to distinguish it from the background 30 of the image I; and
- the recognition and identification sub-step E1B, the purpose of which is to assign to any target 4 (detected in the image I at the detection sub-step E1A) a recognition class (corresponding to a level of knowledge linked to the category of the target; for example, a car that is distinguished from a pedestrian) or an identification class (corresponding to a level of knowledge more precise than the recognition class; for example, if it is a car, the knowledge of its precise model).

In both sub-steps E1A and E1B, the methods considered for performing the functions are based on machine learning techniques. The machine learning uses models built beforehand during a learning phase. This learning phase is performed offline, i.e. it is implemented only once before using the device 1 in a second online (or test) phase on observation images. During this phase, a learning algorithm builds models that are then used in the test phase.

They are called classification models because they allow the device to classify the target examples extracted from the observed scene:
- in the case of the detection, into known or unknown targets (or background examples); and
- in the case of the recognition and the identification, into different categories (or models or versions) of known targets.

The method P comprises at least one learning step E0A, implemented prior to the detection and identification step E1, consisting in generating the (classification) models stored in the database 14.

The proposed learning algorithm uses to build the models, a base of example images, whose ideal response by the classification models (detection and recognition and identification classes) is known. The classes are predetermined. This is called tagged data. Such a learning technique using data labeled by an expert is referred to as supervised learning. The base of labeled images used by the learning is referred to as the training database. It can potentially comprise a large number of images.

Figure 6:
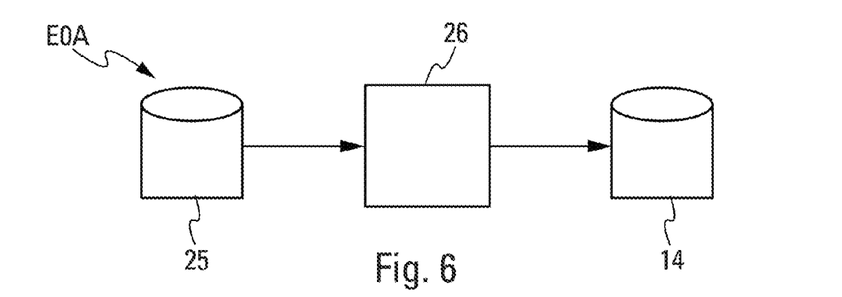
FIG. 6 is the block diagram of a supervised learning of classification models.

FIG. 6 shows the learning step E0A. Specifically, from a training database 25, a supervised learning of IRD classification models (reference 26) is implemented so as to generate the models to be stored in the database 14.

By way of illustration, we can cite some examples of supervised learning-based algorithms that can be used in the learning step E0A (FIGS. 5 and 6):
- Support Vector Machine (SVM) algorithms, associated with a visual descriptor, e.g. Histogram of Oriented Gradient (HOG);
- algorithms based on decision tree forest (random forest classifiers);
- convolutional neural networks, in particular deep learning, which present solutions allowing to produce classifiers by learning.

Therefore, the inputs to the detection and identification unit 8 (implementing the detection and identification step E1) are as follows:
- an observation digital image I of the scene (containing the target 4), in which it is desired to measure the distance of one or more targets, which image I is received from the image generator 6 by means of the link 9; and
- IRD models of known targets, which have been obtained by machine learning, which are contained in the database 14 and which are received by means of the link 15.

The outputs of the detection and identification unit 8 (implementing the detection and identification step E1), which are transmitted to the orientation estimation unit 10, are as follows:
- a segmentation of the target, namely the lists of the pixels belonging to the target or the lists of the pixels belonging to the outline 23 of the target 4 (FIG. 3) or the coordinates of the bounding box 24 of the target 4 (FIG. 4); and
- a label assigned to the target 4 in the recognition and identification sub-step E1B.

The detection and identification unit 8 thus provides a segmentation of the target 4 and its label in the database 14.

The processing described in the present description for estimating the distance of a target 4 identified in an image I can of course be implemented (in a similar manner each time) for estimating the distances of each of a plurality of targets, in the case where several (known) targets are identified in the image I.

For simplification purposes, it is referred to as target 4 FIGS. 3 and 4, being understood that in these figures it is the representation in the image I of the real target (being located in the scene from which image I was taken).

Once the target is finely located in the image I and identified, the method P comprises the orientation estimation step E2 implemented by the orientation estimation unit 10. In order to know the relative position in the space of the target 4 with respect to the image generator 6, it is necessary to know under which point of view the target 4 is observed.

Indeed, the knowledge of the dimensions of the target 4 alone is not sufficient to be able to know the measurement of the length (for example in meters) of an apparent segment S1, S2, S3 of the target 4 observed in the image I. It is necessary to know under which point of view the target 4 is observed. The chosen solution is to estimate the orientation of the target 4, i.e. the orientation of the target 4 in the space in an Euclidean reference frame. It is assumed that the target 4 is non-deformable and has principal orientations along three axes in the space (e.g. height, length and width of a right block). The orientation can therefore be provided by three angles.

For this purpose, the orientation of the target 4 is estimated by comparing its observation in the image with orientation estimation models of this target 4 previously elaborated and present in the database 20 (or in the database 14 in an alternative embodiment). This can be performed using for example 3D models of the target or via orientation estimation techniques based on non-linear regression.

In a first embodiment, the orientation estimation step E2 consists in comparing the target 4 to known target models (with defined orientation), stored in the database 20.

Furthermore, in a second embodiment, the orientation estimation step E2 consists in implementing an estimation method based on a non-linear regression from data (function) stored in the database 20 (or in the database 14 in an alternative embodiment).

In this second embodiment, the method P comprises at least one learning step E0B, implemented prior to the detection and identification step E1, consisting in generating said non-linear regression stored in the database 20.

Figure 7:
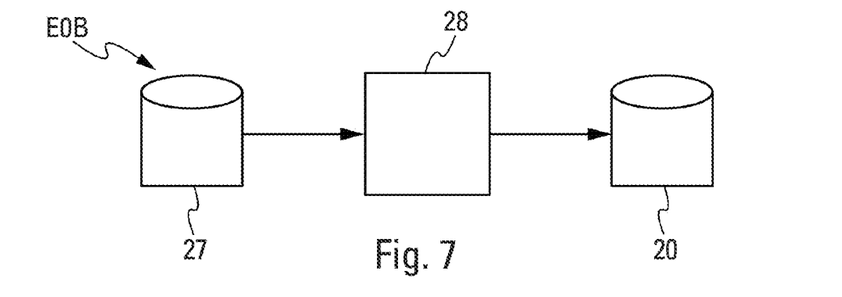
FIG. 7 is the block diagram of a supervised learning of orientation estimation models of known targets.

FIG. 7 shows the learning step E0B. Specifically, from a training database 27, a supervised learning of orientation estimation models (reference 28) is implemented so as to generate the orientation estimation models to be stored in the database 20.

The orientation estimation can therefore be performed using:
3D models of known targets; or
orientation estimation techniques based on a non-linear regression obtained through supervised learning. The algorithms described above (SVM, neural network, etc.) can be used for this purpose. These algorithms are used in the same way as before, except that the product of the learning is not a classifier but a continuous function that associates an orientation estimate (three angle values) of the target with the image of the target.

Furthermore, the distance estimation step E3 that follows comprises a measurement sub-step E3A, implemented by the measurement element 18, consisting in measuring on the image I the length l1 of a characteristic segment S1 of the target 4, as shown in FIG. 3. The characteristic segment S1 represents, in this case, the length of the set of the wheels of the track of the tank 5 (or the wheelbase of the tank), as shown in image I.

In the scope of the present invention, the characteristic segment may correspond to any segment that is easily recognizable on the target 4, and whose actual length on the target 4 is known, namely the length L1 for the segment S1 (FIG. 2).

In the case where a bounding box 24 is defined, as in the example of FIG. 4, the characteristic segment may be the length of the bounding box 24 (such as the characteristic segment S2) or the width of the bounding box 24 (such as the characteristic segment S3).

The distance estimation step E3 also comprises a calculation sub-step E3B consisting in calculating the distance D from said measured length l1, a known actual length L1 of the characteristic segment S1 on the target 4 taking into account the orientation of the target 4 and the spatial resolution of the image generator 6.

Figure 8:
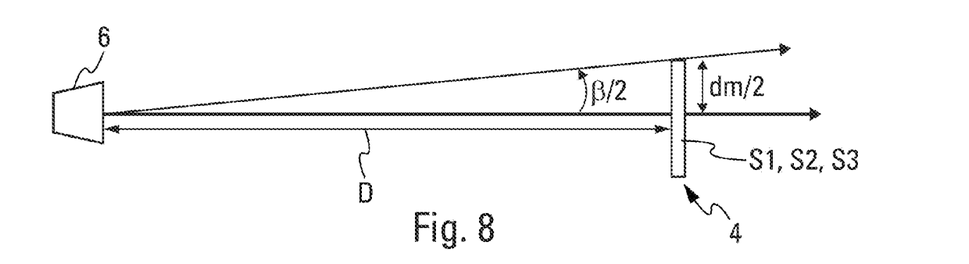
FIG. 8 shows schematically a distance calculation mode.

In a preferred embodiment, the calculation sub-step E3B, implemented by the calculation element 19, consists in calculating the distance D between the position P1 of the observer 2 and the position P2 of the target 4 (FIG. 2) using the following expression:

$$D = dm/(dp \cdot \theta)$$

in which (FIG. 8):
dm represents an apparent length (in meters) of the characteristic segment S1, S2, S3 corresponding to the actual length of this characteristic segment S1, S2, S3 taking into account the orientation of the target 4;
dp represents the measured length (in pixels) in the image I of the characteristic segment S1, S2, S3, for example the measured length l1 of the segment S1 and
θ represents the spatial resolution of the image generator 6, to which angle of view in the reality corresponds the length of a pixel in the image.

As shown in FIG. 8, the distance D satisfies the following relationship:

$$D = \frac{dm/2}{\tan\left(\frac{\beta}{2}\right)}$$

D is therefore approximately equal to dm/β.
Since, in addition, β=dp·θ, we obtain the above equation:

$$D = dm/(dp \cdot \theta)$$

On the one hand, the knowledge of the geometry of the target 4 and of its relative orientation with respect to the image generator 6 allows to know the measurement (in meters) in the scene of an apparent segment S1, S2, S3 of the target 4 in the image I, for example the largest segment inscribed in the apparent surface of the observed target. On the other hand, we can provide a measurement (in pixels) in the image I of this same segment S1, S2, S3. Knowing the spatial resolution e, the latter directly provides the apparent angle at which this segment is observed. We therefore finally try to find the length D of one side of a triangle, for which we already know the length of another side (dm/2) and one of the angles (β/2), as shown in FIG. 8.

Furthermore, in a first embodiment, the detection and identification step E1 and the orientation estimation step E2 are two separate steps, implemented successively, as shown in FIG. 5, whereas, in a second embodiment, the identification and orientation steps are implemented in a single step (referred to as identification and orientation).

The method P, as described above, can be implemented in two different ways.

In a first embodiment, it is implemented fully automatically.

In a second embodiment, the detection and identification step E1 and the orientation estimation step E2 are implemented semi-automatically (with an intervention of an operator). In this case, the operator imposes or corrects the segmentation and/or the identification of the target. In addition, the distance estimation step E3 is implemented automatically.

The method P also comprises at least one image generation step E0C, implemented prior to the detection and identification step E1, consisting in generating at least one image I using the image generator 6 from the position P1 of the observer 2.

In a particular embodiment, the device 1 comprises additional distance calculation elements (not shown) based on several techniques used in parallel. The generated result (estimated distance) is obtained, in this embodiment, from a combination (average, etc.) of the results of these different techniques. The complementarity of the different techniques can thus be used to improve the overall robustness and accuracy of the estimation of the distance.

The method P thus allows to estimate the distance D between a target 4 observed in a digital image I and the image generator 6 (which generated this digital image I) which is geometrically characterized (calibrated). More particularly, the processing chain implemented by the method P allows a distance measurement between the known observed target and the observer, from a single image (a single camera, at a given time) and without electromagnetic emissions intended to illuminate the target (passive system).

The method P allows to estimate, automatically and without contact, the distance separating a target and its observer without the latter having to move, by means of a passive optical system (image generator 6).

In summary, the method P is limited to the measurement of the distance between the observer 2 and a set of previously known and geometrically characterized targets 4. For this purpose, a database of targets is available, the dimensions of which are known in particular, and an attempt is made to measure the distance D between the observer 2 and these targets 4 when they are observed in a digital image I resulting from the image generator 6 used. The image generator 6 is calibrated. In particular, its spatial resolution is known. When the observation image I is generated, it is subjected to a processing chain (method P), which has three main steps. The principle of the method P is to compare the dimension (or length) measured in meters in the scene, and in pixels in the image, and then to produce an estimate of the distance which is linked to these two quantities via the spatial resolution of the image generator 6.

The method P (of distance estimation), as described above, has the following advantages in particular:
- it is passive and requires only one image generator (or imager) that is calibrated and at least one database 14 containing observed targets;
- it offers a passive, undetectable (stealth) solution, unlike active solutions;
- it is simple to implement;
- it does not need any particularly specific equipment. It uses a monocular (single imager) hardware device that is not bulky, inexpensive, relatively simple and non-specialized; and
- it performs the distance measurement by means of automatic image processing based mainly on geometric aspects and not requiring a complex atmospheric transmission model. Its implementation does not require knowledge of an atmospheric absorption model.

The invention claimed is:

1. A method for estimating the distance between a position of an observer and a target, using at least one image generated by a digital image generator from the position (P1) of the observer,
wherein the method comprises a sequence of steps comprising:
a detection and identification step (E1) consisting in detecting and identifying at least one target (4) in the image (I), from at least one list of known targets;
an orientation estimation step (E2) consisting in determining the orientation of the target identified in the image; and
a distance estimation step (E3), the distance estimation step (E3) comprising a measurement sub-step (E3A) consisting of measuring, on the image, the length (l1) of at least one characteristic segment (S1, S2, S3) of the target and a calculation sub-step (E3B) consisting in calculating the distance (D) from said measured length (l1), and from an actual length (L1) known of the characteristic segment (S1, S2, S3) on the target taking into account the orientation of the target and a spatial resolution of the digital image generator.

2. The method according to claim 1, wherein the detection and identification step (E1) comprises:
a detection sub-step (E1A) consisting in detecting at least one target in the image; and
a recognition and identification sub-step (E1B) consisting in assigning a class to the detected target.

3. The method according to claim 2, wherein the detection sub-step (E1A) consists in performing one of the following operations on the image: identifying pixels of the target, identifying pixels of an outline of the target, and generating a bounding box encompassing the target.

4. The method according to claim 2, wherein the class is one of the following classes: a recognition class, and an identification class.

5. The method according to claim 1, wherein the detection and identification step (E1) implements a machine learning using classification models.

6. The method according to claim 5, wherein the method comprises at least a first learning step (E0A), implemented prior to the detection and identification step (E1), consisting in generating said classification models.

7. The method according to claim 6, wherein at least one of said first and second learning steps (E0A, E0B) implements one of the following algorithms:
at least one support vector machine algorithm;
at least one algorithm based on a decision tree forest; and
at least one convolutional neural network.

8. The method according to claim 1, wherein the orientation estimation step (E2) consists in comparing the target with known target models.

9. The method according to claim 1, wherein the orientation estimation step (E2) consists in implementing an estimation method based on a non-linear regression.

10. The method according to claim 9, wherein the method comprises at least one second learning step (E0B), implemented prior to the orientation estimation step (E2), consisting in generating at least one non-linear regression model.

11. The method according to claim 1, wherein the calculation sub-step (E3B) consists in calculating the distance D between the position (P1) of the observer and the target using the following expression:

$$D = dm/(dp \cdot \theta)$$

in which:
dm represents an apparent length of the characteristic segment (S1, S2, S3), corresponding to the actual length (L1) of the characteristic segment (S1, S2, S3) taking into account the orientation of the target;
dp represents the length (l1) measured on the image of the characteristic segment (S1, S2, S3); and
θ represents the spatial resolution of the image generator.

12. The method according to claim 1, wherein the method further comprises at least one of the following steps:
an image generation step (E0C), implemented prior to the detection and identification step (E1), consisting in generating at least one image using the image generator from the position (P1) of the observer; and an information transmission step (E4), implemented after the distance estimation step (E3), consisting in transmitting at least the estimated distance (D) to at least one user system.

13. The method according to claim 1, wherein the detection and identification step (E1) and the orientation estimation step (E2) are implemented in a single step.

14. The method according to claim 1, wherein the method is implemented automatically.

15. The method according to claim 1, wherein the detection and identification step (E1) and the orientation estimation step (E2) are implemented semi-automatically, and wherein the distance estimation step (E3) is implemented automatically.

16. A device for estimating the distance between a position of an observer and a target, using at least one image generated by a digital image generator from the position (P1) of the observer, wherein the device comprises:
 a detection and identification unit configured to detect and identify at least one target in the image, from at least one list of known targets;
 an orientation estimation unit configured to determine the orientation of the target identified in the image; and
 a distance estimation unit configured to measure, in the image, the length (l1) of at least one characteristic segment (S1, S2, S3) of the target, and to calculate the distance (D) from said measured length (l1), an actual length (L1) of the characteristic segment (S1, S2, S3) on the target taking into account the orientation of the target and a spatial resolution of the digital image generator.

17. The device according to claim 16, wherein the device further comprises at least one of the following elements:
 at least one predetermined database containing at least said list of known targets;
 the digital image generator configured to generate at least one image (I) from the position (P1) of the observer; and
 an information transmission unit configured to transmit at least the estimated distance (D) to at least one user system.

* * * * *